May 9, 1961 P. PANHARD 2,983,197
TURRETS, ESPECIALLY FOR ARMORED VEHICLE
Filed Jan. 24, 1958 5 Sheets-Sheet 2

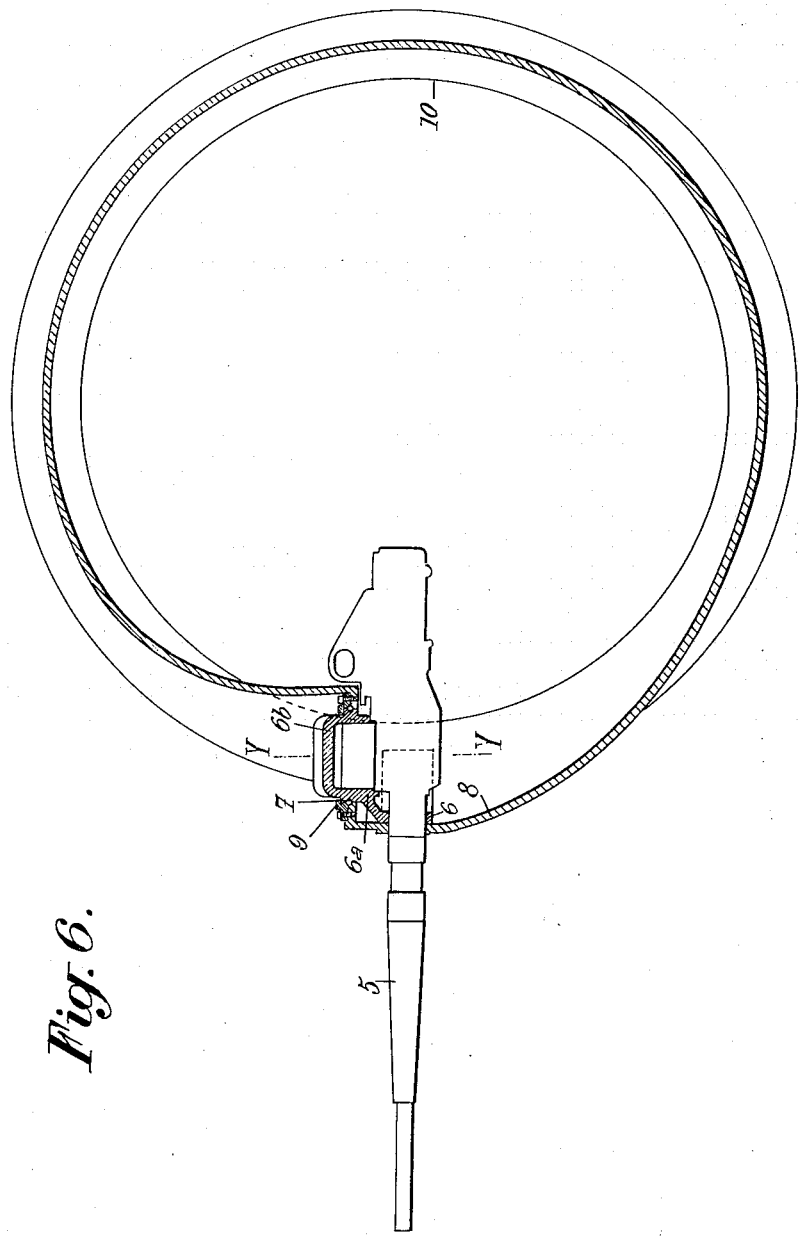

United States Patent Office 2,983,197
Patented May 9, 1961

2,983,197

TURRETS, ESPECIALLY FOR ARMORED VEHICLE

Paul Panhard, Paris, France, assignor to Societe Anonyme des Anciens Etablissements Panhard et Levassor, Paris, France, a French society Filed Jan. 24, 1958, Ser. No. 710,963

Claims priority, application France Jan. 28, 1957

3 Claims. (Cl. 89—36)

The present invention relates to turrets containing automatic guns, and more particularly to turrets for use in armored vehicles.

In such turrets, disposal of the spent cartridge cases constitutes a problem because of their great number and the limited space inside the turret. It has been proposed to fit the guns of these turrets with bags or the like which collect the empty cartridge cases. These bags, however, are cumbersome and their capacity is limited.

The object of my invention is to provide a turret of high offensive and defensive characteristics, i.e., having a high fire power and a good armor thickness, without the turret's being too heavy, while avoiding the above mentioned drawbacks.

For this purpose, according to my invention, the turret is provided, in a portion of its wall making an acute angle with the vertical, with a hole provided with means, rigid and preferably integral with said turret, forming a circular bearing of horizontal axis in which is journalled a trunnion member including an extension forming, inside the turret, a mount for an automatic gun the barrel of which projects to the outside of the barrel through an elongated hole provided therein, said trunnion member being provided with a conduit directly connecting the spent cartridge case ejection port of the gun with the outside of the barrel, means being provided to shield the inlet of said conduit from enemy fire.

Preferred embodiments of my invention will be hereinafter described with reference to the accompanying drawings, given merely by way of example, and in which:

Fig. 6 is a view similar to Fig. 1 showing another embodiment of the turret according to my invention, a single machine-gun being mounted in the turret according to this embodiment.

Figure 1:
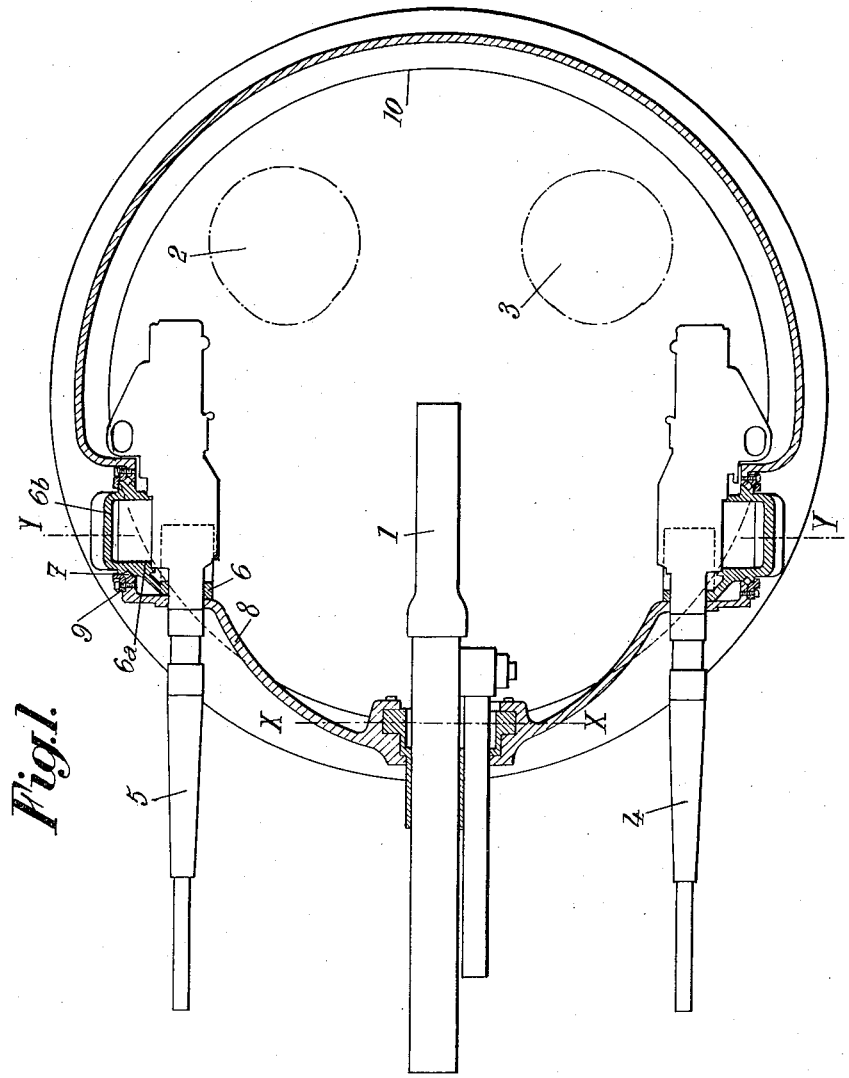
Fig. 1 is a plan view of a turret according to my invention containing two machine-guns and a grenade launching gun, the wall of the turret being cut along a plane located at the level of said machine-guns.

In the embodiment of Figs. 1 to 4, the turret contains two machine-guns 4 and 5 capable of pivoting about an axis Y—Y with respect to the wall 8 of the turret and a grenade launching gun 1 also pivoted to said wall 8 about an axis X—X. The heads of the gunners are shown at 2 and 3 (Fig. 1). The circle along which the turret rotates on its support is shown at 10.

Figure 2:
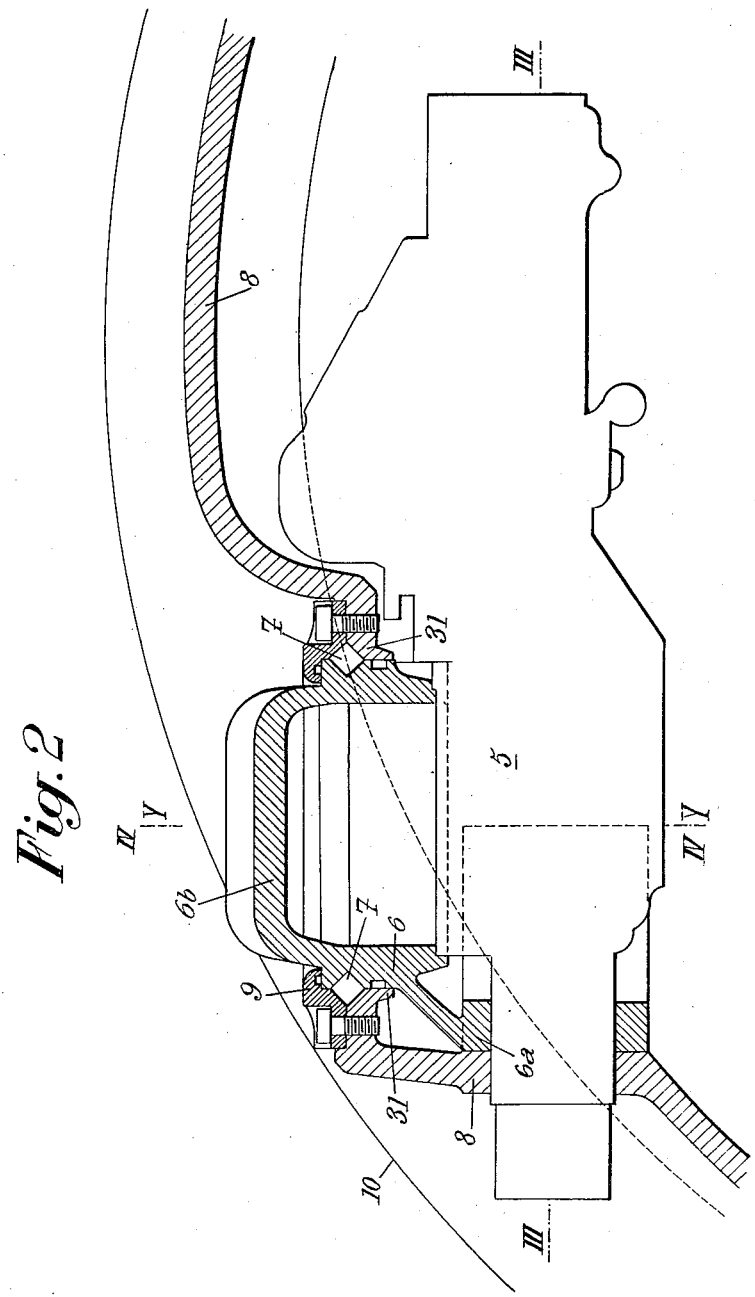
Fig. 2 is a view on an enlarged scale of a portion of this turret, in section on line II—II of Fig. 4.
Figure 3:
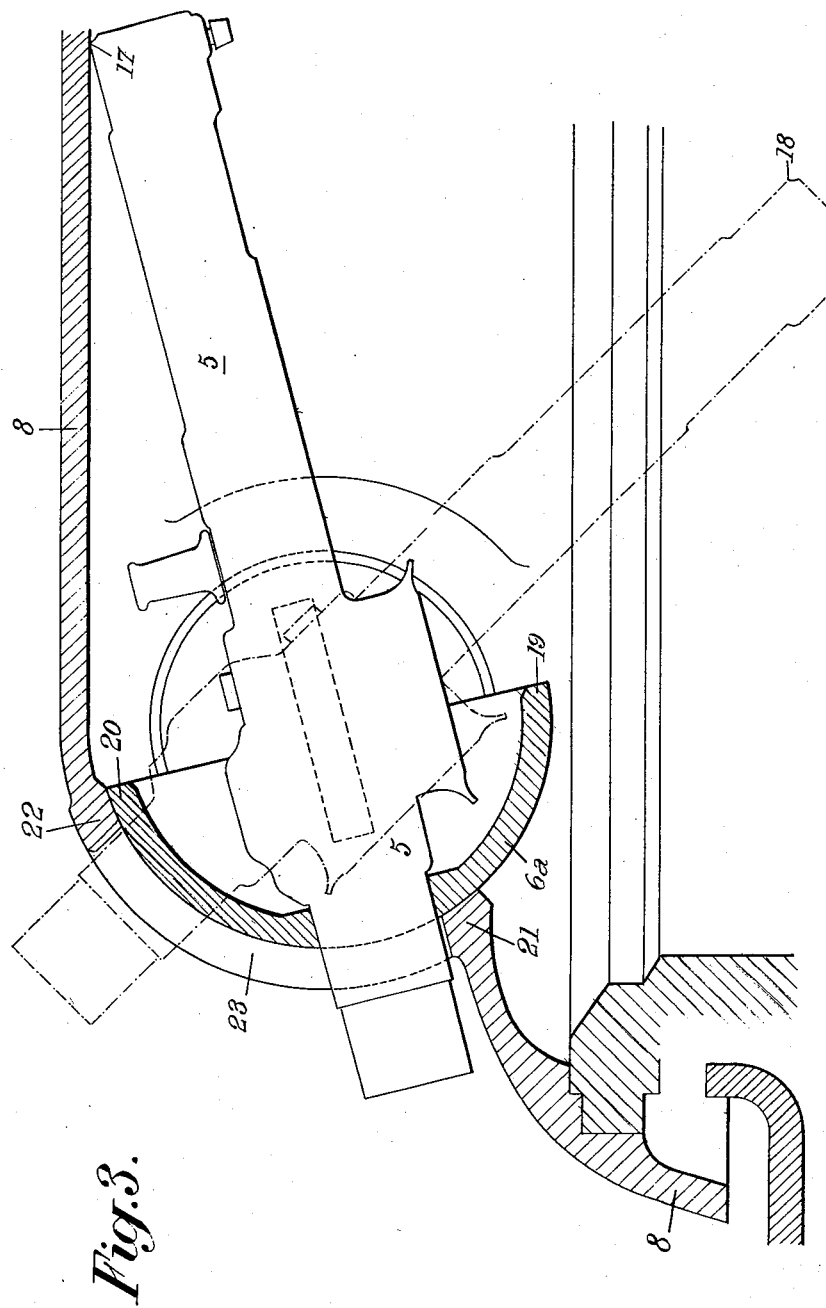
Fig. 3 is a corresponding longitudinal vertical section on line III—III of Fig. 2.
Figure 4:
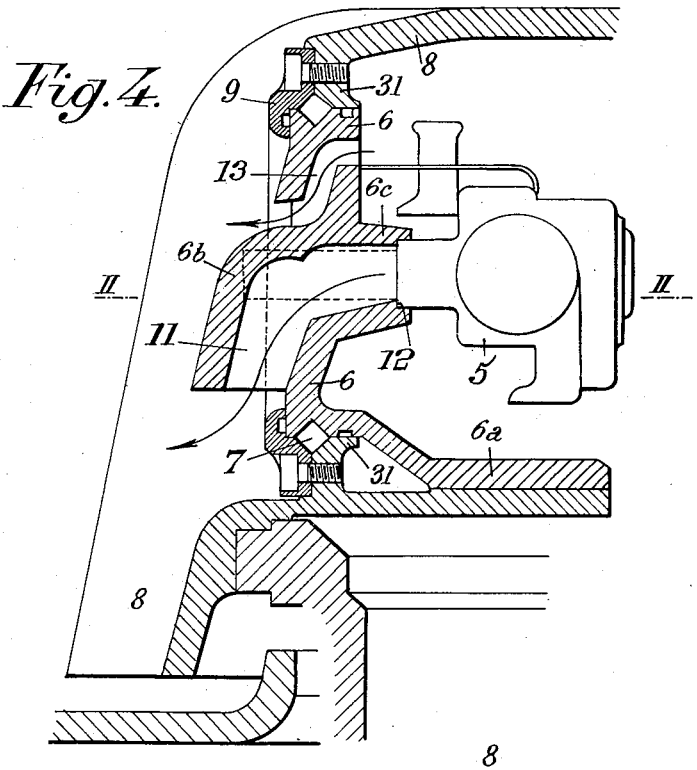
Fig. 4 is a corresponding transverse vertical section on line IV—IV of Fig. 2.

I will now describe, with particular reference to Figs. 2 to 4 inclusive, how machine-gun 5 is mounted in the turret.

The wall 8 of said turret is provided, in the portion thereof making an acute angle with the vertical, with a circular hole the flanged edge 31 of which forms a circular bearing about the horizontal axis Y—Y. In this bearing is journalled, with the interposition of rollers 7, a trunnion member 6, held in position by a ring 9 screwed on the wall 8 of the turret. Advantageously, rollers 7 are of the type described in my French Patent No. 973,265, filed August 9, 1941.

Trunnion member 6 includes, integral therewith, an inward extension 6c forming a mount for gun 5. Member 6—6c is provided with a conduit 11, the inlet of which is in line with the lateral ejection port 5a of gun 5, whereas the outlet of said conduit 11 is on the outside of the turret. Thus, the spent cartridge cases from gun 5 are directly ejected to the outside.

In order to protect the inlet of conduit 11, that is to say gun 5 located inside the turret, against enemy fire, means are provided to shield said conduit. In the construction of Figs. 2 to 4, said means are constituted by an extension 6b of trunnion member 6. Furthermore, said trunnion member 6 is provided with a passage 13 for ejection of the elements of the cartridge belt (links or fabric strip).

Of course, the turret wall 8 must be provided with an elongated hole 23 for the passage of the gun therethrough, said hole being located substantially in the vertical plane of oscillation of the gun. In order to cover said hole, trunnion member 6 is provided with an inward extension 6a of circular vertical section fitting against the portion of the wall 8 of the turret on either side of said elongated hole 23, as visible on Fig. 3. Said portion 6a extends over a circular arc of such magnitude that its ends 19 and 20 never expose the ends 21 and 22 of hole 23.

Figure 5:
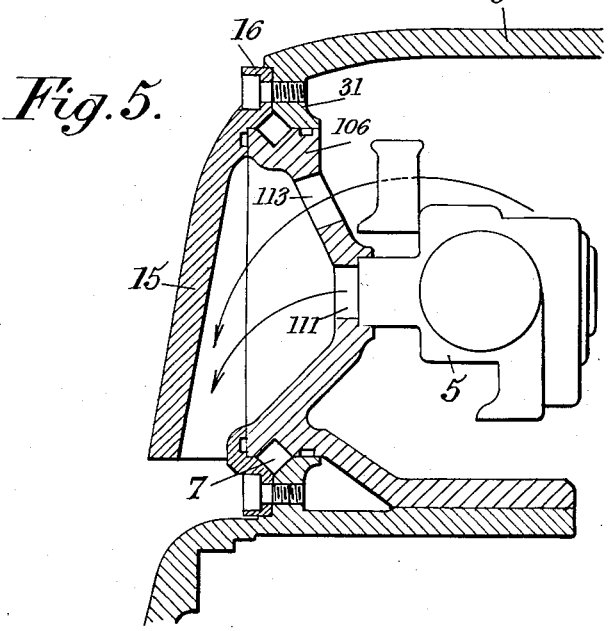
Fig. 5 is a view similar to Fig. 4 showing a modification.

In the modification of Fig. 5, the spent cartridge cases are ejected through conduit 111 and the belt elements through conduit 113. Both of these conduits are shielded against enemy fire by a member 15 which is fixed with respect to the turret. In the construction illustrated by said figure, said shield 15 is integral with the ring 16 serving to hold trunnion member 106 in the bearing 31.

Fig. 3 shows that the turret may be made very flat while permitting the gun to oscillate between two positions in one of which the gun makes an angle —15° with the horizontal (the rear end 17 of the gun being then in contact with the ceiling of the turret) whereas in the other it makes an angle of +45° with the horizontal.

With the construction according to my invention, it is possible to make a turret of an armor thickness of 12 millimeters and containing two machine-guns and a grenade launching gun which weighs about 200 kilograms, whereas up to now a turret of the same armor thickness but containing only one machine-gun weighed from 350 to 400 kilograms.

It should be well understood that the arrangement of guns illustrated by Fig. 1 is not the only possible one according to my invention. In particular, a machine-gun may be mounted along the fore and aft axis of the turret, as shown by Fig. 6.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. Apparatus comprising a turret including a section defining a vertically disposed circular opening, a circular bearing on said turret and surrounding said opening, a trunnion journalled in said bearing and pivotal about a substantially horizontal axis, said trunnion including, integrally therewith, a gun mount extending into said turret, a gun on said mount, said turret having a vertically elongated opening through which said gun extends, said gun having an ejection port opening laterally towards said circular opening, said trunnion defining an internal conduit communicating with said port and extending laterally and horizontally therefrom in coaxial relationship with said horizontal axis to a position outside of said turret, and means shielding said conduit externally of said turret and defining a passage leading in substantially downward direction therefrom.

2. Apparatus as claimed in claim 1, wherein the latter said means defines a further passage substantially parallel to said conduit and opening within the turret and also downwardly into said passage thereby providing for the discharge of an ammunition belt and the like from said turret.

3. Apparatus as claimed in claim 1, wherein the latter said means defines a passage independent of said conduit and opening within the turret and externally thereof to provide for the discharge of ammunition belts and the like.

References Cited in the file of this patent
UNITED STATES PATENTS

| | | |
|---|---|---|
| 2,200,283 | Lennon | May 14, 1940 |
| 2,445,853 | Huey et al. | July 27, 1948 |

FOREIGN PATENTS

| | | |
|---|---|---|
| 466,310 | Great Britain | May 26, 1937 |
| 840,925 | France | Jan. 28, 1939 |